Feb. 12, 1946.    R. V. TRADER    2,394,825
AIRPLANE TAIL SUPPORT
Filed April 30, 1943
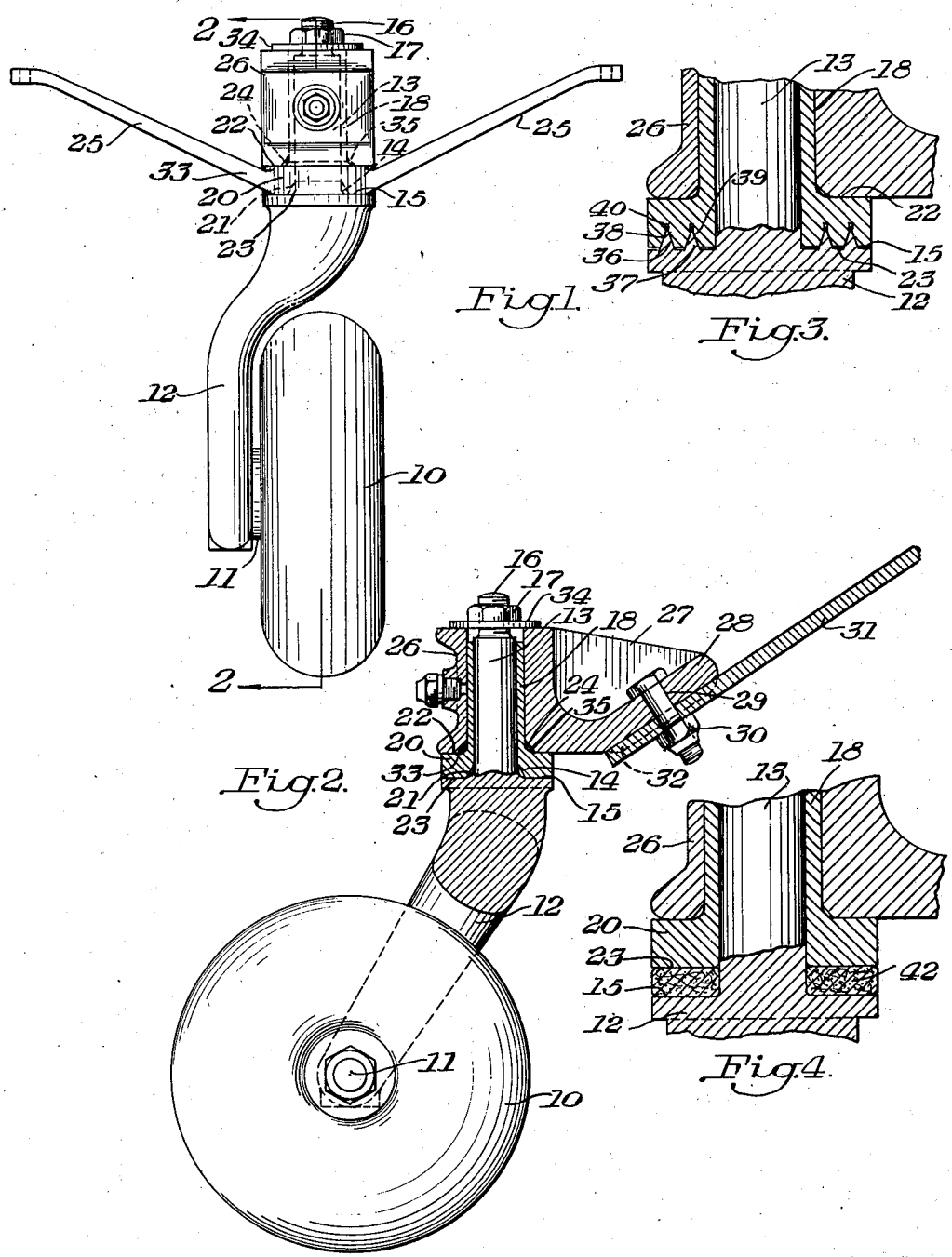
INVENTOR.
Russell V. Trader
BY Patented Feb. 12, 1946

2,394,825

UNITED STATES PATENT OFFICE 2,394,825

AIRPLANE TAIL SUPPORT

Russell V. Trader, Mifflin Township, Allegheny County, Pa.

Application April 30, 1943, Serial No. 485,126

2 Claims. (Cl. 244—50)

This invention relates generally to airplane landing gears and more particularly to a structural arrangement for supporting the tail of aircraft on the surface of the land or water.

The principal object of this invention is the provision of a support for the tail of aircraft on the surface of the land or water which is effective through the rudder control in guiding the craft while taxiing but may swivel independently to sharply turn the craft when moving under its own power or being shifted or stored manually.

Another object is the provision of an improved aircraft tail supporting structure that is rugged and permits flexible maneuverability.

Another object is the provision of an improved bearing structure for aircraft tail supports.

Other objects and advantages appear in the following description and claims.

A practical embodiment illustrating the principles of this invention is shown in the accompanying drawing, wherein Fig. 1 is an end view in elevation of the tail supporting structure comprising this invention.

Fig. 2 is a sectional view taken along the line 2—2 of Fig. 1.

Fig. 3 is a detailed sectional view showing another form of bearing.

Fig. 4 is a detailed sectional view showing a friction disc mounted between bearing surfaces.

Referring to the drawing, 10 represents the surface-engaging portion of the tail support which in this instance is a landing wheel that is rotatably mounted on the horizontally disposed shaft 11 fixed to the wheel knuckle 12. The form of the surface-engaging member of the tail support and its mounting is immaterial to the practice of this invention, as a pontoon or a forked wheel mounting could be employed if the need arose. It is only necessary that the mounting is arranged to horizontally offset the surface engaging member sufficiently to provide a caster action in swiveling. The upper end of the knuckle 12 is provided with an upwardly projecting spindle 13 the axis of which is offset horizontally from the center of movement of the surface engaging member or wheel 10. It is preferable to form the spindle 13 integrally with the knuckle 12 and to provide a fillet 14 to strengthen it due to the change in cross section where the spindle joins the annular radial shoulder or bearing surface 15 on the knuckle. The outer end of the spindle is reduced in diameter and threaded as indicated at 16 for receiving the nut 17. The threaded end section 16 is also filleted at its base to strengthen the stud at this position.

The spindle 13 extends through and is journaled in the bore of the sleeve 18 which is preferably formed of bronze if the knuckle and the spindle are made from steel. The lower end of the sleeve 18 is provided with an integral annular flange 20 the bore of which is beveled as shown at 21 to clear the fillet 14 on the spindle. The upper and lower annular faces 22 and 23 of the flange 20 are bearing surfaces. The under surface 23 of the flange 20 engages the shoulder 15 of the knuckle. These two surfaces act as friction clutches as well as bearing surfaces. A fillet 24 lies between the upper face 22 and the outer cylindrical surface of the sleeve 18.

The flange 20 is provided with a pair of oppositely projecting steering arms 25, the outer ends of which are arranged to be provided with suitable resilient means for connecting them to the rudder arms or aircraft rudder manipulating mechanism. It is necessary that this connection be resilient since the tail supporting mechanism oscillates vertically as a unit when landing or being moved over a rough surface.

The outer cylindrical surface of the sleeve 18 is journaled in the bore of the block or tail casting 26 which is longer than the cylindrical surface of the spindle 13. That part of the casting having the vertical bore is substantially cylindrical and has a pair of spaced web sections or sides 27 extending forwardly on each side thereof and are connected adjacent their lower edges by the heavy transverse section 28. This transverse section of the casting is provided with a hole 29 to receive the bolt 30 for fastening the tail support to the extended leaf or bar 31 of the tail skid spring. The lower edges of the sides 27 extend below the transverse section 28 to form a trough or groove 32 for receiving the bar 31 to prevent the casting 26 from turning relative to the skid.

A washer 34, larger in diameter than the cylindrical portion of the casting 26, is placed under the nut 17 on the stud 16 at the end of the spindle 13 to retain the knuckle on the casting when the aircraft is in flight. Ample clearance is provided between the top of the spindle 13 and the sleeve 18 to allow for considerable wear on both sides of the flange 20, the shoulder 15 of the knuckle and the under circular surface 33 of the casting 26 which rides on the top surface 21 of the flange 20. The lower end of the bore in the casting 26 is beveled at 35 to clear the fillet 24 between the sleeve 18 and the flange 20.

When the nut 17 secures the washer 34 in place, and is locked by a cotter key, sufficient play is allowed to permit the knuckle and the steering arms to move freely while there is no weight on the tail support. Thus when the aircraft is in flight the movement of the steering arms adds little or no load to the rudder control. This is an important object of this invention as it reduces the weight of the tail supporting structure which otherwise would be added operating weight to the rudder control system.

The structure illustrated on the drawing represents the simplest form of tail support for small airplanes. Frusto conical anti-friction bearings could be substituted for journaling the sleeve 18 in the casting 26 when the tail support is used on large heavy airplanes to reduce the load on the rudder manipulating mechanism. The spindle 13 could be journaled in ball bearings but the friction of the sleeve and the engaging bearing surfaces 15 and 23 are both active in the structure shown for turning the knuckle 12 with the steering arms 25. However it is quite natural that the friction of the spindle 13 in the sleeve 18 represents only a small portion of the clutch action in turning the knuckle.

With this tail support mounted on an airplane which has brakes on the wheels of the landing gear, the brakes need not be used for taxiing across field or making wide turns but if it is desired to pivot or sharply turn the plane the application of the brake on the pivoting or inner wheel, with a simultaneous blast by the propeller will cause the tail wheel 10 to caster, taking a new position relative to the steering arms 25. Again when the airplane is being moved manually, a shove sideways on the tail causes the tail wheel 10 to caster and permits the plane to be easily stored with parts interleaved with airplanes stored adjacent thereto. The full swivel effect of the tail wheel 10 reduces the space, time and the men required to store the plane, which is an important factor in handling small training planes. This advantage coupled with the fact that the plane can be readily steered when traveling along the ground are important objects of this invention. Again the structure is not intricate and there is no positive locking arrangement between the spindle 13 and the sleeve 18 or the steering arms 25 and any unusual side thrust of blow on the tail will cause the wheel 10 to caster rather than upset the airplane.

The mating bearing surfaces 15 and 23 shown in Fig. 3 are provided with interengaging annular conical surfaces. The shoulder 15 is provided with two upwardly projecting annular concentric ridges 36 and 37 the cross section of which is of triangular shape. The mating grooves 38 and 39 in the under surface 23 in the flange 20 have a clearance groove 40 for receiving the apices of the ridges 36 and 37. The ridges 36 and 37 may be higher than the depth of their mating grooves and thus maintain a clearance between the radial bearing surfaces 15 and 23, and the weight of the tail is carried solely by the mating conical surfaces. These mating conical surfaces act as retarding clutch faces which prevent relative movement between the members unless subjected to a sudden force such as the application of one landing gear brake or a sudden side thrust on the tail of the plane when it is supported by the bearing structure.

The clutch surfaces 15 and 23 shown in Fig. 4 are the same as that shown in Fig. 1 but they are separated by a washer 42 which may be made of a brake band material or other friction generating material that retards the free action between the flange 20 and the knuckle 12. The washer may be secured to one or the other of its adjacent members to direct or concentrate the wear for the washer 42 has an abrasive action because of the character of material from which it is made. Again the mating surfaces 15 and 23 may each have friction material molded thereon, in which case the wear would be on the mating friction surfaces.

Each of these different forms of clutch or friction surfaces operate to move the knuckle 12 with the rudder mechanism as the plane taxies on the field. They may differ in the degree of friction between these members and thus be employed for use with airplanes of different size and weights. However in each instance the tail wheels may be swiveled to store or pivot the plane on one wheel of the landing gear.

Although this disclosure has specifically referred to the support of a tail structure of an airplane it is applicable to the control of the front wheel of a tricycle landing gear of an airplane. When the plane lands the front single wheel is controlled by the rudder actuating mechanism to guide its movements along the ground.

I claim:

1. In an airplane, the combination of a casting arranged to be attached to the structure of the airplane and provided with a cylindrical bore, a sleeve extending upwardly in the bore and journaled therein, operative connection between the steering mechanism of the airplane and the sleeve to cause the sleeve to turn with the rudder, a spindle suspended from the casting and journaled in the sleeve, a ground surface engaging member secured to the lower end of the spindle and offset from the axis of the latter to enable the member to caster in response to a lateral shove or force when the airplane is on the ground, radial surfaces interposed between the spindle and the sleeve arranged to be pressed into frictional engagement by the weight of the airplane when the latter is on the ground to enable the airplane to be steered when taxiing on the ground, said frictional engagement being at least partially relieved when the airplane is in flight to permit the sleeve to turn with the rudder while the spindle remains substantially idle.

2. In an airplane, the combination of a casting arranged to be attached to the structure of the airplane and provided with a cylindrical bore, a cylindrical sleeve inserted in the bore to rotate therein, operative connection between the sleeve and the steering mechanism of the airplane to cause the sleeve to turn with the rudder when the airplane is in the air or taxiing on the ground, a spindle suspended from the casting and having a rotary fit within the sleeves, a ground surface-engaging member carried by the lower end of the spindle and offset therefrom, and bearing surfaces interposed between the lower end of the bore and the sleeve, and like surfaces interposed between the sleeve and the spindle arranged to be pressed into frictional contact with each other to retard the rotation of the sleeve when the weight of the airplane is imposed on the casting to cause the spindle and the ground engaging member to swivel in response to the steering means when the airplane is moving on the ground but to permit the ground engaging member to caster in response to a laterally applied shove or other force.

RUSSELL V. TRADER.